US007299989B2

(12) United States Patent
Schuessler

(10) Patent No.: US 7,299,989 B2
(45) Date of Patent: *Nov. 27, 2007

(54) SYSTEM AND METHOD FOR DECODING AND ENCODING COMPENSATED OPTICAL CODES

(75) Inventor: Frederick Schuessler, Baiting Hollow, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 467 days.

This patent is subject to a terminal disclaimer.

(21) Appl. No.: 10/975,880

(22) Filed: Oct. 28, 2004

(65) Prior Publication Data

US 2005/0092840 A1    May 5, 2005

Related U.S. Application Data

(63) Continuation-in-part of application No. 10/830,735, filed on Apr. 23, 2004, now Pat. No. 6,840,450, which is a continuation of application No. 10/013,400, filed on Dec. 10, 2001, now Pat. No. 6,834,803.

(60) Provisional application No. 60/256,007, filed on Dec. 15, 2000.

(51) Int. Cl.
*G06K 13/06* (2006.01)
*G06K 13/24* (2006.01)

(52) U.S. Cl. .................. 235/484; 235/462.02

(58) Field of Classification Search ................ 235/484, 235/463, 462.01–462.02, 462.49, 462.07, 235/462.12, 494
See application file for complete search history.

(56) References Cited

U.S. PATENT DOCUMENTS 3,916,154 A    10/1975    Hare et al.

(Continued)

*Primary Examiner*—Lisa Caputo
*Assistant Examiner*—Edwyn Labaze
(74) *Attorney, Agent, or Firm*—Carter, DeLuca, Farrell & Schmidt, LLP

(57) ABSTRACT

An optical code reader system is provided for reading a presented optical code having first and second sets of elements, the first set of elements including a plurality of elements having a first reflective property and the second set of elements including a plurality of elements having a second reflective property. The system includes a photo sensor module which senses incident light reflected from the presented optical code and generates electrical signals corresponding to the sensing. The system further includes a software decoder module executable on a processor for uncompensating the presented optical code by adjusting a relative measured dimension of individual elements of the first set of elements in accordance with a predetermined adjustment factor for uncompensating the first set of elements without uncompensating the second set of elements for generating an uncompensated optical code.

23 Claims, 6 Drawing Sheets

U.S. PATENT DOCUMENTS

| | | |
|---|---|---|
| 4,074,852 A | 2/1978 | Wescott et al. |
| 4,354,101 A | 10/1982 | Hester et al. |
| 5,468,946 A | 11/1995 | Oliver |
| 5,514,858 A | 5/1996 | Ackley |
| 5,619,027 A | 4/1997 | Ackley |
| 5,637,853 A | 6/1997 | Joseph |
| 5,777,309 A | 7/1998 | Maltsev et al. |
| 5,803,624 A | 9/1998 | Miazga et al. |
| 5,850,080 A | 12/1998 | Herzig |
| 5,853,252 A | 12/1998 | Wright et al. |
| 5,877,486 A | 3/1999 | Maltsev et al. |
| 5,889,270 A | 3/1999 | van Haagen et al. |
| 5,890,818 A | 4/1999 | Sansone |
| 5,929,420 A | 7/1999 | Cai |
| 6,098,883 A | 8/2000 | Zocca et al. |
| 6,247,646 B1 | 6/2001 | Iwaguchi et al. |
| 6,556,690 B1 * | 4/2003 | Nelson ................... 382/100 |
| 6,802,449 B2 | 10/2004 | Schuessler |
| 2002/0121553 A1 | 9/2002 | Schuessler |
| 2004/0084540 A1 | 5/2004 | Schuessler |

\* cited by examiner

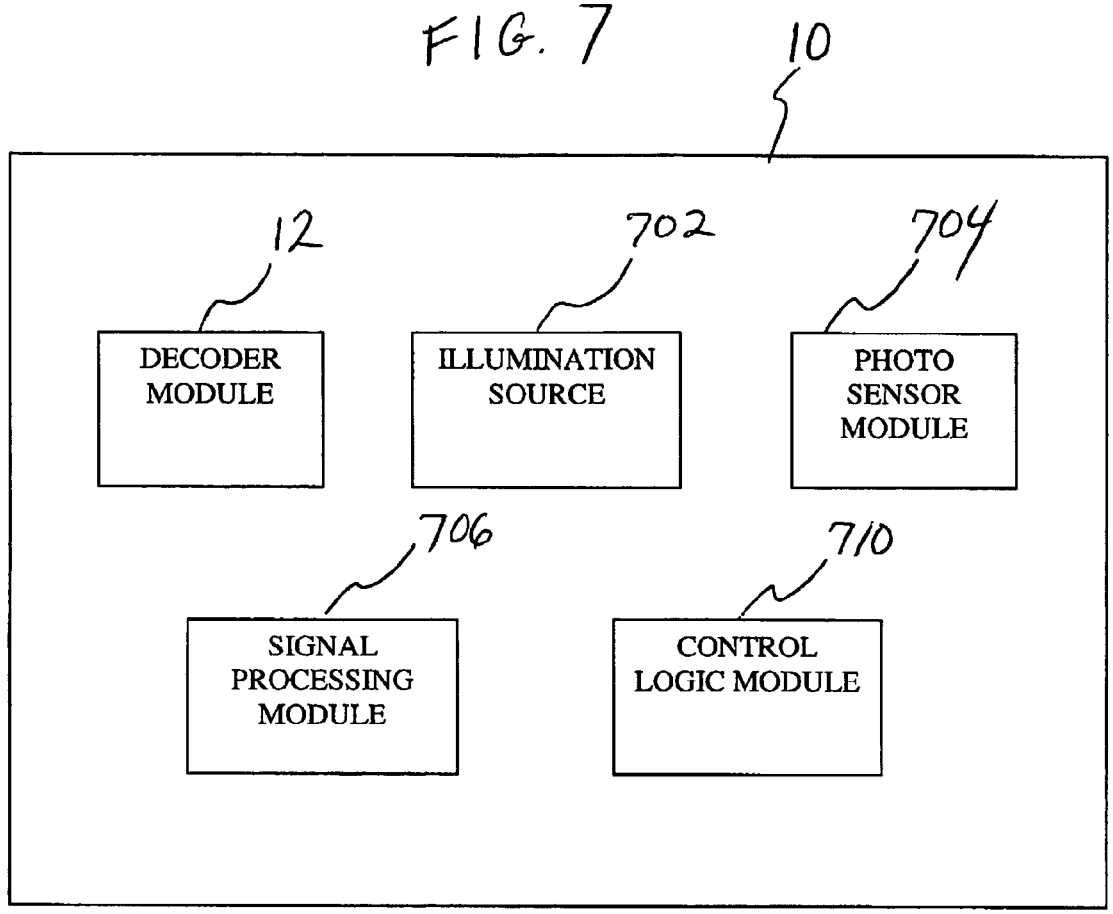

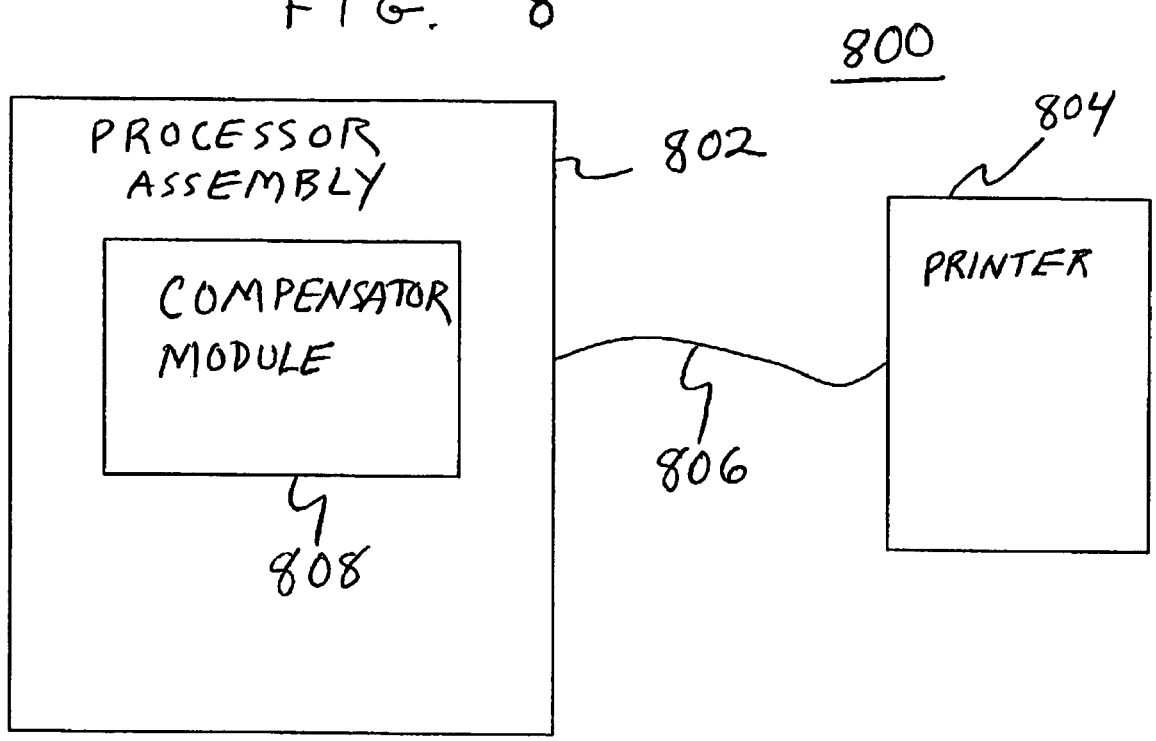

SYSTEM AND METHOD FOR DECODING AND ENCODING COMPENSATED OPTICAL CODES

CROSS-REFERENCES TO RELATED APPLICATIONS

This application is a continuation-in-part application of U.S. application Ser. No. 10/830,735, filed Apr. 23, 2004 now U.S. Pat. No. 6,840,450, which is a continuation application of application Ser. No. 10/013,400, filed Dec. 10, 2001 now U.S. Pat. No. 6,834,803, which claims priority under 35 U.S.C. § 119 to U.S. Provisional Application Ser. No. 60/256,007, filed on Dec. 15, 2000 and entitled "Ink-Spread Compensated Bar Code Symbology And Compensation Methods", the entire contents of all applications are expressly incorporated herein in their entirety.

FIELD OF THE INVENTION

The present invention relates to a new method of pre-compensating for ink spread (often called "print gain" or "dot gain") before printing a bar code or binary code. More specifically, the present invention relates to a system and method for generating or decoding a compensated optical code.

BACKGROUND

There are two encodation schemes commonly used in modern bar code symbology design, "Binary" encoding and "(n,k)" encoding. Each have their advantages and disadvantages; generally speaking, (n,k) encoding is more space-efficient, but Binary encoding is more tolerant of poor printing. Thus, both types will continue to be widely used for the foreseeable future.

"Binary" codes (such as Code 39) define the set of bar/space patterns making up its "language" or bar code character set using only two choices ("wide" or "narrow") for each bar and space of each pattern. The wide:narrow ratio can be selected when printing each bar code. Selecting a 2:1 ratio creates a more compact bar code; a 2.5:1 or 3:1 ratio makes the bar code wider, but also makes it easier for the scanner to distinguish wide elements from narrow ones (helpful when printing on rough cardboard, for example).

"Delta Distance" codes (Such as UPC-A and Code 128) use an encodation scheme known as (n,k) encoding, to define the set of bar/space patterns making up its "language" or bar code character set. In an (n,k) code, each bar code character is comprised of "k" bars and "k" spaces (e.g., 3 bars and 3 interleaved spaces), and each individual bar and space is an integer multiple (1, 2 . . . m) of a unit width (called a "module"). Unlike the case for Binary codes, these ratios cannot be altered to accommodate difficult printing situations.

One characteristic that the Binary and (n,k) encodation schemes share is that they both define a unit width (called a module), and in either scheme, the narrowest bars and the narrowest spaces is both one module wide. Ideally, every printed barcode would be printed exactly to specification, in order to allow a maximum tolerance for noise and other distortions during the scanning process. In practice, however, the printing process can introduce a variety of imperfections, many of these resulting from imperfections in the paper (or other substrate) that the bar code is printed upon. These substrate imperfections may introduce random errors in the positions of the edges that separate dark bars from light spaces within the bar code.

One substrate-induced error stems from the fact that different substrates vary (and even different pages of the same substrate vary) in how they absorb ink at the time of printing. The result is that, on a given sample of a substrate, the dark areas (bars) of a bar code may be significantly wider than the spaces that were nominally of the same width. Yet, on a different sample, the same bar code digital image may result in a printed symbol where the bars are narrower than nominal, rather than wider. It is usually the case, however, that on a given printed sample, all of the printed dots tend to show the same amount of "dot gain" (or loss). Therefore, all of the bar code's bars tend to be either bigger than nominal (and by the same amount), or all are smaller (and by the same amount). Thus, from the perspective of reading a bar code, this dot-gain phenomenon is considered a systematic (not random) error, and is known as "uniform ink spread".

Uniform ink spread is such a common printing problem that current symbology designs almost always rely on a technique called "edge to similar edge decoding" (also called "delta distance decoding") to handle it. Ink spreads uniformly outwardly from the center of each printed dot, and therefore the left and right edges of every printed bar will move outwardly (from the bar's center) by equal amounts. Thus, a measurement taken from the left edge of one bar, across the bar and the next space, to the left edge of the next bar, will not vary with the degree of ink spread. Some bar code symbologies, such as Code 128, were designed to be decoded based on such "edge to similar edge" measurements and thus are relatively immune to uniform ink spread.

Unlike codes such as Code 128, binary codes are typically not decoded using "delta distance decoding" techniques and thus do not have the same inherent immunity to ink spread. However, various techniques for decoding binary codes (by estimating a "threshold" width, ideally halfway between the nominal wide and nominal narrow widths) are well known in the art, and can provide good immunity to ink spread and other printing errors.

Although "delta distance decoding" and other decoding techniques known in the art address some problems caused by ink spread, there is a remaining problem with ink spread that is not solved by these techniques. This problem is that when narrow (1-module) spaces shrink due to ink spread, they can become so narrow that they may not be seen at all by the scanner (or at the least, will reduce the effective working range of the scanner). So, even with "delta distance" codes, some form of ink spread control is required. This is done by adjusting the ideal representation of the bar code before printing it, a process often known as "pre-compensation" of the image.

Traditional ink-spread pre-compensation methods involve reducing the width of each printed bar with an exactly corresponding increase in the width of each space (or the opposite, increasing the bar width and decreasing the space, for rare cases where the expectation is for a consistently under-inked printing process). For example, one might adjust the ideal bar code image by replacing the last column of black pixels of every bar with a column of white pixels (i.e., "shaving" one dot from the right edge of every bar). The advantage of this traditional approach is that the decoding technique, as described above, gives an identical edge-to-similar-edge measurement, whether compensation was applied or not. The major disadvantage is that, by definition, the bar code image contains bars that are less than 1 module wide. This creates two significant problems.

First, if in a given instance of printing, the ink does not spread, the printed code will have bars that are smaller than nominal. This condition can degrade scannability. Similarly, if the ink-spread phenomenon is not consistent from one printed sample to another, then the traditional pre-compensation method will sometimes improve system performance, and sometimes degrade it.

Second, the compensated image now contains "finer" lines than before. It is common for the same page layout file to be used for printing on presses with different physical resolutions (i.e., the physical distance between dots of the printer vary significantly across printing processes). The last step in the publishing chain, called Raster Image Processing, maps the image to the addressable dots of the printer. This stage, and previous stages, can introduce rounding or scaling errors in the widths of the bars and spaces. The thinner the bars, the more likely that the process will create an occasional bar that is much too wide or narrow, resulting in an unreadable barcode.

Thus, in order to avoid both of these problems, the ideal pre-compensation method would not decrease the size of any bars or spaces of the bar code.

The use of bar codes in printed advertisements and newspaper text is expected to increase significantly in the near future, as the cost of Internet-enabled scanning devices becomes low enough for the consumer mass market. Currently, several methods have been proposed for using a printed bar code for automatically connecting to an appropriate site on the World Wide Web. As a result of this and other applications, it will become increasingly common to print the same bar code image, and the same advertisement containing a bar code image, in a variety of print media including magazines, newspapers, catalogs, and telephone directories (white pages and yellow pages). Each of these print media typically has its own combination of printing press technology (such as gravure, offset, and flexography) and paper (ranging from high-weight glossy paper in magazines, to recycled newsprint and the very low-weight paper used in a telephone book), each variation of which may have different ink spread characteristics. Therefore, as consumer scanning applications proliferate, it will no longer be feasible to generate a single bar code image, or a single ad containing a bar code, that will be appropriately pre-compensated for all of the substrates it will be printed on, using traditional pre-compensation techniques.

SUMMARY OF THE INVENTION

A main object of the present invention is to provide a method for print gain compensation that does not reduce the widths of any elements of a bar code or binary code.

Another object of the present invention is to provide a bar code symbology, where the ideal image of the bar code does not require further compensation for ink spread or reduction, and therefore is more suitable than current symbologies for printing in a wide variety of press processes, to a wide variety of paper and other substrates.

A further object of the present invention is to provide a method for print gain compensation by designing a symbology that does not contain any spaces as small as the nominal narrowest bar width, so as to minimize the negative effects of ink spread.

Yet another object of the present invention is to provide a bar code symbology, where the reader system can automatically discriminate between the standard version of the symbology, and one or more versions that have been pre-compensated for print gain using the techniques of the present invention.

Yet a further object of the present invention is to provide a method for decoding a pre-compensated symbology.

It is yet a further object of the present invention to provide an optical code reader device for reading a compensated optical code, including decoding the compensated code.

It is still a further object of the present invention to provide a system and method for generating a compensated optical code based on data relating to an uncompensated optical code.

These and other objects and advantages of the present invention are achieved in accordance with the present invention in which pre-compensation is applied to an existing optical code encodation scheme wherein the digital image of the code increases the width of the spaces, but does not reduce or increase the widths of the bars. In particular, and in accordance with one embodiment of the method of the present invention, the pattern of printed areas and spaces for a given data input is determined and a given length is added to the length of each space while the length of the printed areas remains unchanged to enlarge the overall length of the resulting code symbol in the at least one dimension.

The resulting bar code image will result in a robust printed symbol, even if the final printing stage introduces no dot gain, or even exhibits dot loss rather than dot gain. The method according to the present invention, while particularly suitable for bar codes and in particular for n, k bar codes, can be used with other types of optical codes, such as binary codes, that suffer from ink spread problems.

The existing optical code symbology is preferably a bar code having bars and spaces of varying widths and wherein the added given length is a function of the width of the narrowest space. Preferably, the bar code is an n, k bar code and wherein the added length is a function of a module width of the resulting bar code symbol. In a preferred embodiment, the added length is x modules where $0<x\leq 2$ and most preferably the added length is 0.5 or 1 module.

In a particularly commercially advantageous embodiment of the present invention, wherein the n, k bar code is an 11, 3 bar code wherein the bars and spaces are from 1 to 4 modules in length. A bar code of this type is described in U.S. patent application Ser. No. 60/237,639, the entire contents of which are hereby incorporated by reference.

In another embodiment of the invention, the code symbology is a two-dimensional code symbology and preferably it is a bar code and most preferably an n, k bar code, such as PDF417. In a further embodiment of the invention, auto-discrimination is added to the resulting code symbol to enable a reader to determine that the code symbol is an ink-spread compensated variant for the decoding thereof. In one embodiment, the auto-discrimination is added by using different data characters than in the existing symbology. Alternatively, auto-discrimination comprises using a different subset of codeword than in the existing symbology. In another variation, auto-discrimination is added by using a unique data character pattern to identify the code symbol as an ink-spread compensated variant. Further, auto-discrimination can be added by providing a unique start pattern in the resulting code symbol, a unique stop pattern in the resulting code symbol or both. The auto-discrimination can also be added by providing a unique finder pattern in the resulting code symbol.

A method in accordance with the invention of decoding an ink-spread compensated variant of an existing n, k bar code symbology produced in accordance with the invention comprises discriminating that the bar code symbol is an ink-spread compensated variant and what the amount of the added length, normalizing the width of a character to add the total added length and varying the threshold for the spaces to include the length added thereto.

An ink-spread compensated n, k bar code symbology in accordance with the invention comprises characters having k bars and k spaces of varying width, wherein the width of each bar is from 1 to m modules in length and wherein the width of each space is from 1+x to m+x modules in length, wherein 0<x≦2 modules in length, and wherein the overall length of each character is n+kx modules. Preferably, the n, k bar code is an 11, 3 bar code wherein the bars and spaces are from 1 to 4 modules in length and most preferably x is 0.5 module or 1 module.

In accordance with another embodiment of the invention an optical code reader system is provided for reading a presented optical code having first and second sets of elements, the first set of elements including a plurality of elements having a first reflective property and the second set of elements including a plurality of elements having a second reflective property. The system includes a photo sensor module which senses incident light reflected from the presented optical code and generates electrical signals corresponding to the sensing. The system further includes a decoder module having software instructions executable on at least one processor for digitally processing the electrical signals for performing an algorithm. The processing includes performing an algorithm for uncompensating the presented optical code by adjusting a relative measured dimension of individual elements of the first set of elements in accordance with a predetermined adjustment factor for uncompensating the first set of elements without uncompensating the second set of elements for generating an uncompensated optical code. The processing further includes performing an algorithm for decoding the uncompensated optical code.

In yet another embodiment of the disclosure a computer readable medium storing a set of programmable instructions configured for execution by at least one processor is provided for reading a presented optical code having first and second sets of elements, the first set of elements including a plurality of elements having a first reflective property and the second set of elements including a plurality of elements having a second reflective property. The programmable instructions include means for providing for uncompensating the presented optical code by adjusting a relative measured dimension of individual elements of the first set of elements in accordance with a predetermined adjustment factor for uncompensating the first set of elements without uncompensating the second set of elements for generating an uncompensated optical code. The programmable instructions further include means for providing for performing an algorithm for decoding the uncompensated optical code.

In still another embodiment of the system a system is provided for generating compensated optical codes. The system includes a processor assembly having at least one processor and a compensator module executable on the at least one processor for performing an algorithm. The algorithm includes the steps of receiving data associated with an uncompensated optical code encoded in accordance with an encodation scheme including a pattern of representations of first and second sets of elements, the first set of elements including a plurality of elements having a first reflectivity property and the second set of elements including a plurality of elements having a second reflectivity property. The algorithm further includes the step of generating data representing a compensated optical code having a pattern of representations of first and second sets of elements, the first set of elements including a plurality of elements having the first reflectivity property and the second set of elements including a plurality of elements having the second reflectivity property, wherein the pattern of the compensated optical code is substantially the same as the pattern of the uncompensated optical code, except that representations of a dimension of individual elements of the first set of elements is adjusted in accordance with a predetermined adjustment factor for compensating the representations of the first set of elements without compensating the representations of the second set of elements.

In another embodiment of the disclosure a computer readable medium storing a set of programmable instructions configured for execution by at least one processor is provided for generating a compensated optical code. The programmable instructions include means for providing for receiving data associated with an uncompensated optical code encoded in accordance with an encodation scheme including a pattern of representations of first and second sets of elements, the first set of elements including a plurality of elements having a first reflectivity property and the second set of elements including a plurality of elements having a second reflectivity property. The programmable instructions further include means for providing for generating data representing a compensated optical code having a pattern of representations of first and second sets of elements, the first set of elements including a plurality of elements having the first reflectivity property and the second set of elements including a plurality of elements having the second reflectivity property, wherein the pattern of the compensated optical code is substantially the same as the pattern of the uncompensated optical code, except that representations of a dimension of individual elements of the first set of elements is adjusted in accordance with a predetermined adjustment factor for compensating the representations of the first set of elements without compensating the representations of the second set of elements.

BRIEF DESCRIPTION OF THE FIGURES

The foregoing and other features of the present invention will be more readily apparent from the following detailed description and drawings of illustrative embodiments of the invention in which:

FIG. 7 shows a functional block diagram of a reader device of the optical code reader system shown in FIG. 6; and FIG. 8 shows a system for generating ink-spread compensated optical codes in accordance with the present invention.

DETAILED DESCRIPTION OF THE PREFERRED EMBODIMENTS

Figure 1:
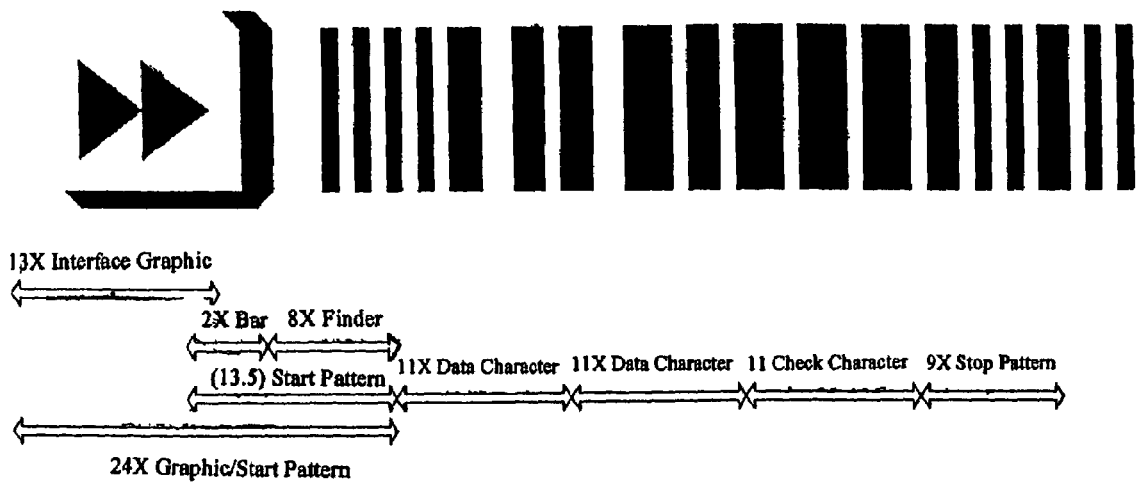
FIG. 1 shows an n, k bar code called a Scanlet without ink-spread compensation intended to be used on different print media along with references to elements thereof.

According to the present invention, a bar code symbology is modified to compensate for ink spreading by increasing the width of the spaces without decreasing the width of the printed lines. This new technique is that it is inherently safer than conventional compensation techniques when the amount of ink spread is unknown (e.g., when the same bar code image in a print ad goes to both newspapers and magazines, and will be printed on a variety of paper substrates).

The technique of "Delta Distance Decoding" is sufficient to fully compensate for variable amounts of ink spread, except for the fact that too much ink spread will cause the narrow spaces of the bar code to become so small as to negatively affect scanner performance. Traditional pre-compensation techniques address this problem by reducing the size of the printed bars to thereby make the adjacent narrow spaces larger, at the expense of the adjacent narrow bars, which can become smaller than nominal.

Use of the present invention raises two primary concerns. First, the new method makes the bar code somewhat larger (it grows by about 13% when "1.5× spaces" are used, and by about 27% when "2× spaces" are used). Second, unlike the traditional bar-shaving method, the present method requires that the decoder determine or auto-discriminate whether or not a given barcode has been pre-compensated in this new way. Given these concerns, the present method is most useful when the amount of ink spread is not known in advance.

Two methods for auto-discrimination are disclosed in detail below: (a) creating a variant of the symbology (e.g., changing the Stop pattern of a code disclosed in the aforementioned pending application, hereinafter referred to as a Scanlet, or using Code 128 with characters of the opposite bar parity), and (b) using only a subset of the encodable character set for the first data character to "flag" the compensated version. For instance, if Code 128 characters are used, characters containing "T distances" that are all either 3× or 4× (before pre-compensation) decode properly whether or not the decoder "thinks" that compensation is present.

To apply the new pre-compensation technique to any defined (n, k) character set, a new "stretched" version of the set is defined in which the bar widths are unchanged but all of the space widths of each character are increased by the same amount (typically either by 0.5× or by 1×). This creates a "new" bar/space character set that can be trivially mapped back to the original set by simply subtracting that fixed amount from each measured T distance.

For example, Code 128 character set is a (11, 3) code (each pattern or symbol character comprises 11 modules, and contains 3 bars and 3 spaces, or six elements in total) and is shown below as Table I. Applying the present methodology using 2× spaces to maximize tolerance to ink spread produces a "stretched" (14, 3) character set. In this new set, each of the three spaces of each pattern have been increased by 1×, so a total of three modules have been added to each pattern, but no 1× spaces have been used. The resulting set of patterns can be thought of as identical to the original Code 128 set, except that:

Each set of 3 bars and 3 spaces must be normalized against 14 modules when decoding, rather than against 11, and Each T distance that is calculated during the decode process must be decreased by 1 before the pattern lookup occurs.

For example, as normally printed, the bars and spaces of the Code 128 symbol character "00" have the series of widths 2, 1, 2, 2, 2, 2 (in the order bar, space, bar, space, bar, space). Summing each pair of adjacent elements, this forms a "T sequence" of 3, 3, 4, 4, 4. Applying the present invention using 2× minimum spacing produces a new width sequence of 2, 2, 2, 3, 2, 3 where the widths of the bars are unchanged, but the width of each space is increased by 1×. The new T sequence for this pattern is 4, 4, 5, 5, 5, when normalized against 14 modules.

The normalization process starts by assuming that the overall character width "p" (in this case the width of a set of 6 bars and spaces) represents a predetermined number of modules (11 for standard Code 128, but 14 for "2×-Stretched" Code 128). Then, each edge-to-similar-edge measurement is converted to an integer.

For example, assume that a laser spot traveled across this pattern at a certain rate so that crossing a 1-module bar took 100 microseconds, and crossing a 2-module bar took 200 microseconds, and so on. The resulting measurements from crossing the "stretched" pattern (if no ink spread occurred) would be 200, 200, 200, 300, 200, and 300 microseconds. The character width is 1400 microseconds, the sum of these six measurements.

To calculate the T distances, the traversal time for adjacent bars b and spaces s are summed, multiplied by the expected number of modules, and divided by the total traversal time. In the present example, the first T distance is $((b1+s1)*14)/p=((200+200)*14)/1400=4$. Continuing these calculations produces a T sequence for the stretched pattern of 4, 4, 5, 5, 5. Subtracting 1 from each T distance re-creates the original "unstretched" sequence of 3, 3, 4, 4, 4. This sequence can then be decoded to find the intended value "00".

As will be recognized, to arrive at the right calculations, the decoder needs to know to normalize over 14 modules rather than 11. Surprisingly, in the particular case of (11, 3) characters whose T distances are all either 3 or 4, it turns out that the mathematical error introduced from mistakenly normalizing against 11 modules instead of 14 maps closely to the correct value for the original "unstretched" character.

For example, for the first T distance of the "stretched" character, the calculation becomes $((200+200)*11)/1400=3.14$ (very far from the printed distance of 4, but very close to the "original" T of 3). A stretched T of 5 (that was originally a T of 4), when mis-normalized against 11, comes even closer to the intended value. In this example, $((200+300)*11)/1400=3.93$. This property can be useful as an auto-discrimination method (see below). More generally, the error introduced for T distances of 2, or for T distances larger than 4 becomes significant and therefore, except for certain character patterns, it is important to normalize against the correct number of modules (in this example, 14 instead of 11).

It should also be noted that, if the printing process is generally adequate in terms of well-placed edges, and ink-spread is the only problem to be addressed, then this technique is advantageous, compared to the alternative of simply printing the symbol at twice the X dimension (which would also result in 2× as the minimum width, but for both bars and spaces). Doubling the X dimension makes the symbol character 100% larger, whereas "stretching" the spaces to 2× makes the symbol character only (14/11) or 27% larger, yet still doubling the width of the narrow spaces for maximum ink spread tolerance.

Although patterns stretched by 1× have been discussed above, the pre-compensation technique can "stretch" each space by amounts other than 1×. Stretching by 0.5×, for example, results in a smaller size penalty (each character grows from 11× to 12.5×, rather than to 14×), while still providing ample tolerance for ink spread (50% ink spread, a substantial amount, will merely reduce the 1.5× spaces back to their "original" 1×).

The new pre-compensation method of the current invention may be applied to any binary or "edge to similar edge decodable" symbology (usually characterized as an (n, k) symbology), either already in existence, or in a new symbology. To apply it to an existing symbology, however, some usage convention (within a closed system or other controlled application) or differentiating feature should be added to the symbology to inform the decoder that wider spaces are being employed. A "usage convention" technique will be described in the first preferred embodiment below. A "differentiating feature" technique for open systems (which could consist of a new Start and/or Stop pattern, or use of an alternate parity subset of the same (n, k) patterns), will also be described below.

The simplest form of usage convention would be a prior agreement to utilize only the print gain tolerant variant of a chosen symbology. For example, it could be agreed by the printing and scanning parties to a closed-system application that Code 128 barcodes will always be printed using 1.5× wide spaces.

A simple usage convention suffices for gain tolerant Binary codes, because a well-chosen combination of printing and decoding techniques can allow standard and gain-tolerant Binary codes to be transparently intermixed in the same system. For example, the standard "Factor R" Code 39 decode algorithm (as disclosed in the AIM symbology specification), if applied to Code 39 symbols printed at a 3:1 wide:narrow ratio, works about as well for symbols with 2× narrow spaces as for traditional symbols with 1× narrow spaces. Alternately, the convention could specify an alternate decoding technique (which sets separate thresholds for bars and for spaces) which would work identically whether a 2:1 symbol (i.e., using 1× and 2× bars) was printed using 1× and 2× spaces, 1.5× and 2.5× spaces, or 2× and 3× spaces. As can be seen, the auto-discrimination issue is fairly easily solved for the case of Binary codes, and so the remainder of this discussion will focus on ways to auto-discriminate gain-tolerant versions of n, k) codes.

A more flexible scheme would utilize a data convention designed to allow both standard Code 128 and print-gain-tolerant Code 128, for example, to coexist in the same application. For example, it could be agreed by the printing and scanning parties to a closed-system application, that Code 128 barcodes starting with certain numbers were printed with standard 1× narrow spaces, whereas Code 128 bar codes starting with certain other numbers were printed with 1.5× narrow spaces. In the case of Code 128, certain symbol character patterns, such as the one representing "02", happen to use values of either 3 or 4 for all of their edge-to-similar-edge measurements. As shown above for the case of 2× minimum spaces, these values decode with very little error, when printed as a 12.5× character but mistakenly normalized against 11 modules. As an example, for the first T distance of the 1.5× "stretched" character, the "misnormalized" calculation becomes ((200+150)*11)/1250=3.08 (very far from the printed distance of 3.5, but very close to the "original" T of 3). A stretched T of 4.5 (that was originally a T of 4), when mis-normalized against 11, comes even closer to the intended value. In this example, ((200+250)*11)/1250=3.96.

Thus, these patterns (that originally contained only 3× and 4× T distances) could be used in the first data position (by convention) such that one subset of these patterns only appear in the 1× symbols, while a second subset of them only appear in the 1.5× symbols. These patterns will decode correctly using an 11× width even if they are printed in a stretched 14× format. The decoder could auto-discriminate the narrow space width being used simply by decoding the first character (assuming a standard 11× character width) and checking which subset of those reserved patterns it was.

The technique just disclosed, of reserving certain patterns to denote the "wider" version of the characters, is simple to apply to an existing symbology design, but it can be relatively inefficient because the first data character pattern no longer carries a full range of data. For a new symbology design, a preferred auto-discrimination technique is to define variations of the symbology's Start and/or Stop patterns and/or data-character patterns, so that the decoder could ascertain the narrow space width from the choice of patterns employed. If the recognition of variants is based on Start and/or Stop patterns (as opposed to using alternative subsets of data-character patterns), it would further be desirable to define these alternate sets of Start/Stop patterns in such a way that a common "finder" routine could identify either version, without doubling the computation requirements of the "finder" process. Therefore, two additional preferred embodiments are disclosed below, one using an alternate set of data character patterns, and one using alternate sets of Start and Stop patterns.

For each given n, k symbology used as a starting point for the application of the techniques described herein, there can be one or more different preferred embodiments of this invention. This is because the design of variations of either the data characters, or of the Start and/or Stop characters, depends both on the standard patterns for each symbology, and on the other symbologies that will also be in use in a given application. One n, k symbology shown in FIG. 1, called Scanlets, is a consumer-oriented bar code that is a particularly appropriate starting point, because of the expectation that printed Scanlets will be generated from an unusually large number of sources, with less control over print gain than is typical for bar codes in industrial applications.

Standard Scanlets use the standard (11, 3, E) data characters of Code 128 (eleven modules per character, consisting of 3 bars and 3 spaces, where the sum of the bars is always an Even number of modules). A second, print-gain-tolerant version of Scanlets can be easily defined, by using the same Start and Stop patterns (except that the spaces are all incrementally wider than standard), but using data character patterns (and check character patterns) that are nominally (11, 3) patterns, but where the Odd subset, rather than the Even subset, is used, such that the sum of the bars is always an odd number of modules, and where the spaces are all widened by a predetermined amount (for example, by 1×). Table II is an odd-parity character encoding that can be ink-spread compensated according to the present invention. For the odd-parity Scanlets in Table II, only 103 values are needed and the others would be excluded. (For example, values 0 and 101 would be excluded, because they begin or end with four narrow elements in a row).

In this embodiment, the decoding process is quite similar to that for unmodified Scanlet decoding except that the character set table needs to list the patterns for both the odd and even subsets of patterns. Since the Start and Stop patterns for standard Scanlets were defined to minimize symbol size, and since this embodiment uses the same patterns (widened only by the print-tolerant spaces), this approach creates a minimum-sized symbology variant. However, this embodiment does not allow the decoder to pick between the two variants (for example, 1× spaces, vs. 1.5× spaces) based on the start and stop patterns alone. Therefore, it requires the decoder to try both decode approaches (i.e., assuming 11× characters with 1× spaces and even parity, then assuming 12.5× characters with 1.5× spaces and odd parity), until one assumption results in an invalid character. In the worst case (which would be very rare, but not impossible), all characters will decode both ways, and the decoder would need to choose the "best fit" one (i.e., the assumption that resulted in decode measurements that were closer to nominal). Various selection and best fit techniques known to those of skill in the art could be used for this purpose.

One preferred embodiment of how Scanlets could be adapted to use the present invention, using unique Start and unique Stop patterns, is disclosed herein. Varying both patterns is preferred, as it provides a self-check that the correct version has been discriminated. In this embodiment, a total of three variants of Scanlets, offering varying degrees of print gain tolerance, can be auto-discriminated. One of these versions is a standard Scanlet which offers no extra degree of print gain tolerance. The two new versions, described herein, are called "Gain Tolerant" or GT Scanlets. These versions compensate for anticipated print gain by increasing the width of the spaces, without a corresponding decrease in the width of the bars. Therefore, these gain-tolerant versions may be utilized when the same Scanlet image will be printed to various press/substrate combinations, with varying or unknown amounts of ink spread. A single image may be safely used for printing systems with variable amounts of print gain (or reduction), because the narrow bars need never be less than 1× wide. If even more gain tolerance is desired, traditional bar width reduction (shaving) can be applied to a GT Scanlet image.

The GT versions of Scanlets use the same set of symbol character patterns as do standard Scanlets, except that the three spaces of each pattern are each increased by 0.5× (in GT15 Scanlets) or by 1.0× (in GT20 Scanlets). The bars in all versions of Scanlets are either 1, 2, 3 or 4 modules wide. The spaces in GT15 Scanlets are 1.5, 2.5, 3.5, and 4.5 modules wide, and the spaces in GT20 Scanlets are 2, 3, 4, and 5 modules wide. Printing processes of any dot-pitch resolution may use GT20 Scanlets, whereas GT15 Scanlets are preferably not used with a low-resolution printing process (less than 5 dots per narrow bar) unless an even number of dots per narrow bar is selected. GT15 and GT20 Scanlets may be read by suitably programmed bar code decoders which have been designed to auto-discriminate them from each other, from standard Scanlets, and from other symbologies.

Except for the differences described herein, the structure of all three versions of Scanlets is as described in the aforementioned application.

a. All three versions of Scanlets preferably use the same Interface Graphic, always printed at the dimensions of standard Scanlets.

b. All three versions of Scanlets preferably use a Finder pattern consisting of a series of four 1× bars interleaved with four narrow spaces (but for GT15 and GT20 Scanlets, the arrow spaces are 1.5× and 2×, respectively). The Interface Graphic is identical for all three versions, and thus the first bar of the Start pattern is always 2× wide. However, the first space of the Start pattern (which is immediately to the left of the first bar of the Finder pattern) is 3× for standard Scanlets, 2.5× for GT15 Scanlets, and 4× for GT20 Scanlets. These patterns were chosen so that one Finder algorithm works with all three versions, while the full Start pattern provides a check that the decode of the Stop pattern indicated the correct version.

c. All three versions of Scanlets preferably use the same set of patterns for data and check characters, with the same values and meanings as standard Scanlets. The only difference is that the three spaces of each pattern are each enlarged (each by 0.5× or 1×, for GT15 Scanlets or GT20 Scanlets, respectively).

d. Standard Scanlets, GT15 Scanlets, and GT20 Scanlets preferably have three distinct Stop patterns, with some features in common. All begin with a bar/space sequence 1n1n2n, where 'n' represents a narrow space (1, 1.5, or 2× wide, respectively), and all have a total of 8 bars and spaces, followed by a terminating bar (that may be any width from one to four modules wide). Thus, in all cases, the width of the first six elements of the Stop pattern is less than 75% of the width of the preceding data character. This change in element density is utilized to recognize the Stop pattern. The fourth bar and fourth space of the Stop pattern are (1, 1), (4, 1.5), and (2, 5) for standard Scanlets, GT15 Scanlets, and GT20 Scanlets, respectively. These patterns were chosen so that a single one-module edge error cannot map to another valid pattern, and so that the versions can be auto-discriminated before the number of space modules per character is known.

The following presents a specific decode algorithm that can auto-discriminate properly between all three versions of Scanlets, while using a common "finding" algorithm in order to minimize the processing requirements (presenting the forward-scan logic only, for simplicity):

1. Find a bar element that is larger than each of the next four bars. To minimize the chance of accidentally accepting a pattern that includes bars that are not in fact nominally smaller than the first one (but are slightly smaller, due to random print defects or scanner noise) reduce the candidate "larger" bar by $\frac{1}{16}$ before doing the four comparisons.

2. Check that the first interleaved space is larger than each of the next four spaces; reduce the candidate "larger" space by $\frac{1}{16}$ before doing the four comparisons.

3. Verify that the sum of these supposed 8 narrow elements is less than the sum of the next six elements (which should be the first data character), but greater than one-half of that 6-element sum.

4. Verify that for each of the seven T distances of the Finder (not including the two leading elements of the complete Start pattern), each T normalizes to 2 modules when a total of 8 modules is assumed. This works regardless of whether the interleaved spaces are 1×, 1.5×, or 2× wide.

5. Do not decode the two leading T distances of the Start pattern until after the Stop pattern has been verified and decoded. The Stop pattern will tell the decoder which version of Scanlets has been printed, and then these leading T's of the Start pattern can be decoded. This serves as a check that the correct version was identified from the Stop pattern: the leading T's of the Starts have been selected such that, if the wrong version is assumed from a misdecoded Stop, the decode of the Start will not match the expected result.

6. Find the Stop pattern, using the same technique as described for a standard Scanlet (the first six elements of the new Stop patterns still maintain the property that they are less than ¾ the width of a data character). Decode the Stop pattern using the following substeps, to determine which version of Scanlets has been printed.

a) Compare the sum of the six elements just found, to T7, the sum of the next two elements.

i) If (2*T7) is less than the width of the sum of the previous six elements, then this 8-element Stop pattern indicates a standard Scanlet. Calculate Z based on the first six elements, normalized to 7 modules. Verify that the eight elements decode as a T sequence of 2, 2, 2, 3, 3, 2, 2.

ii) Otherwise (i.e., (2*T7) is greater than or equal to the width of the sum of the previous six elements):

(a) if the fourth bar (element seven) is greater than the fourth space (element eight), this indicates a GT15 Scanlet. Calculate Z based on the first six elements, normalized to 8.5 modules. Verify that the eight elements decode as a T sequence of 2.5, 2.5, 2.5, 3.5, 3.5, 5.5, 5.5.

(b) Otherwise, this indicates a GT20 Scanlet. Calculate Z based on the first six elements, normalized to 10 modules. Verify that the eight elements decode as a T sequence of 3, 3, 3, 4, 4, 4, 7.

b) Now that the Scanlet version has been determined, and therefore the size of the narrow spaces is known, the leading elements of the Start pattern can be verified. Calculate the value of Z as:

$$Z=(f1+f3+f5+f7)/n\text{Modules},$$

where nModules is 8, 10, or 12, for standard Scanlets, GT15 Scanlets, or GT20 Scanlets, respectively. Verify that the two measurements (T1, T2) decode to (5, 4) if decoding a standard Scanlet, (4.5, 3.5) if decoding a GT15 Scanlet, or (6, 5) if decoding a GT20 Scanlet. In all cases, each measurement is given a tolerance of ±0.5Z.

7. Complete the decode of the Start pattern, which serves as a check that the correct version has been discriminated.

8. Complete the decode of the symbol as described for standard Scanlets in the attached specification, except that the character decode now takes into account which version is being scanned (see the Character-Decode Algorithm below). The character set tables do not need to change, nor does the bar-parity table (the bar-parity check changes, in that normalization is against 11, 12.5, or 14 modules, depending on version). Also, to maximize ink-spread tolerance (since these wider-space Scanlets can easily tolerate 100% ink spread), the decoder should do an ink-spread correction on each data character, just before doing its bar parity check. The ink spread of the Start patterns' elements is easily calculated (once it has been determined whether the Scanlet has nominal 1×, 1.5×, or 2× spaces). This initial value would be used to correct the first data character; the first data character's ink spread can then be calculated and applied to the second character, and so forth. To reduce computation time on unsuccessful scans, the entire process of verifying bar parity could be deferred until after the entire Scanlet has been processed, and its check character has been validated.

Character-Decode Algorithm

The number of modules per symbol character, n, is 11 for standard Scanlets, 12.5 for GT15 Scanlets, and 14 for GT20 Scanlets. The following steps can be used to decode each (11, 3) character within a Scanlet:

1. Calculate eight width measurements p, $e_1$, $e_2$, $e_3$, $e_4$, $b_1$, $b_2$, and $b_3$ (see FIG. 4).

2. Convert measurements $e_1$, $e_2$, $e_3$, and $e_4$ to normalized values $E_1$, $E_2$, $E_3$, and $E_4$ which will represent the module width ($E_i$) of these measurements. The following method is used for the i-th value.

For Standard Scanlets and GT20 Scanlets:
      If $1.5p/n \leq e_i < 2.5p/n$, then $E=2$ for a standard Scanlet, otherwise the character is in error.
      If $2.5p/n \leq e_i < 3.5p/n$, then $E_i=3$
      If $3.5p/n \leq e_i < 4.5p/n$, then $E_i=4$
      If $4.5p/n \leq e_i < 5.5p/n$, then $E_i=5$
      If $5.5p/n \leq e_i < 6.5p/n$, then $E_i=6$
      If $6.5p/n \leq e_i < 7.5p/n$, then $E_i=7$
      If $7.5p/n \leq e_i < 8.5p/n$, then $E_i=8$ for a GT20 Scanlet, otherwise the character is in error.
   Otherwise the character is in error.
   For GT15 Scanlets only:
      If $1.9p/n \leq e_i < 3p/n$, then $E_i=2$
      If $3p/n \leq e_i < 4p/n$, then $E_i=3$
      If $4p/n \leq e_i < 5p/n$, then $E_i=4$
      If $5p/n \leq e_i < 6p/n$, then $E_i=5$
      If $6p/n \leq e_i < 7p/n$, then $E_i=6$
      If $7p/n \leq e_i < 8.15p/n$, then $E_i=7$
   Otherwise the character is in error.

Note that the lower bound for a normalized value of 2, and the upper bound for a normalized value of 7, allow for a small amount of round-off error that can be introduced when a GT Scanlet's X dimension translates to an odd number of printer dots per nominal module.

3. If decoding a GT20 Scanlet, subtract 1 from each of the $E_n$ values calculated above. Look up the character in a decode table using the four values $E_1$, $E_2$, $E_3$, and $E_4$ as the key. This decode table may be found in the Code 128 specification, or may be derived directly from Table I. If using the decode table in the Code 128 specification, note that the $STOP_A$ and $STOP_B$ patterns are invalid when decoding a Scanlet.

4. Retrieve character self-checking value V which is stored in the table with the character (or which can be derived directly from Table 1). The value V is equal to the sum of the modules for the bars as defined for that character.

5. Verify that $(V-1.75)p/n < (b1+b2+b3) < (V+1.75)p/n$
Otherwise the character is in error.

The calculation indirectly uses character parity to detect all decode errors caused by single non-systematic one-module edge errors.

In the embodiment where only two Scanlet versions are used, the standard Scanlets utilize a subset of the bar and space patterns exactly as defined in the Code 128 specification (although the values assigned to those patterns are different). For improved immunity to excessive print gain, the gain-tolerant variation called GT Scanlets are preferred for Scanlets printed at high densities (an X dimension of 10 mils or below). Although the overall structure is the same, 0.5× is added to the width of each interior space of a GT Scanlet (when encoding, this 0.5× is preferably rounded down to the nearest integer number of printer dots).

Figure 2A:
FIG. 2A shows the bar code of FIG. 1.
Figure 2B:
FIG. 2B shows the bar code of FIG. 2A with ink-spread compensation in accordance with the present invention.
Figure 3A:
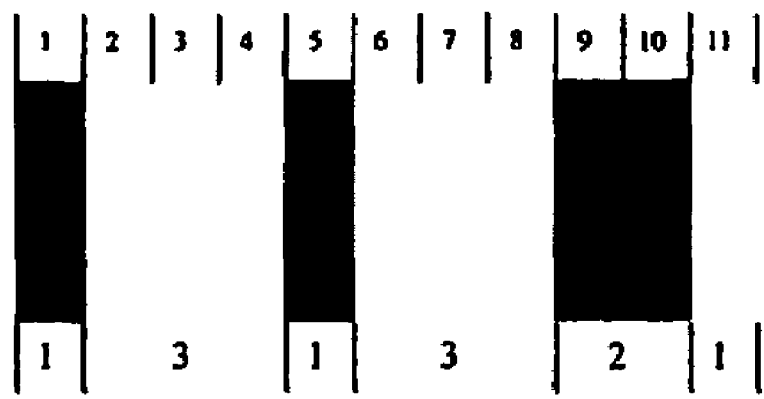
FIG. 3A shows one character of a Scanlet in normal size.
Figure 3B:
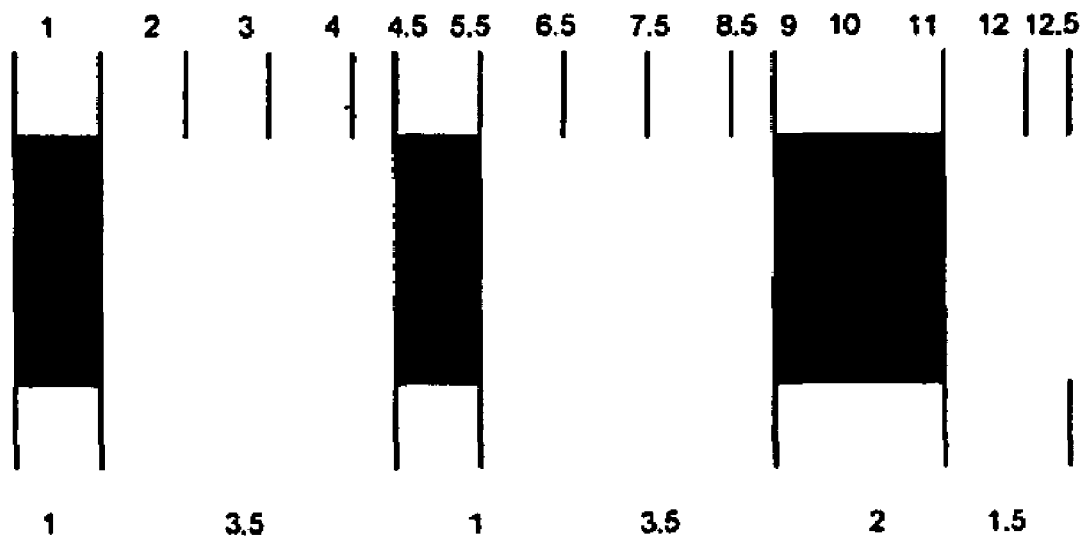
FIG. 3B shows a gain compensated version of FIG. 3A.

A GT Scanlet is shown in FIG. 2B, encoding the same data as FIG. 2A, at the same X dimension. FIG. 3A illustrates the encodation of the pair of digits "34" in a standard Scanlet using symbol character 35. FIG. 3B shows the same data encoded in a GT Scanlet. The bars are exactly as shown in FIG. 3A but each space is 0.5× wider than the FIG. 3A encodation.

The Stop pattern of a standard Scanlet, such as shown in FIG. 1, has eight alternating dark and light elements, starting with a bar. The module widths of the Stop pattern elements form the sequence 1, 1, 1, 1, 2, 1, 1, 1. These are followed by a terminating bar or other dark graphical element, between one and four modules wide, whose function is to delineate the one-module width of the last space of the Stop pattern.

In one embodiment of the invention, the Stop pattern of a GT Scanlet has eight alternating dark and light elements, starting with a bar. The module widths of the Stop pattern elements form the sequence 1, 1.5, 1, 1.5, 2, 1.5, 4, 1.5. These are followed by a terminating bar or other dark graphical element, between one and four modules wide, whose function is to delineate the one-module width of the last space of the Stop pattern.

With reference to the scanlet shown in FIG. 1, the Interface Graphic pattern at the left end of a Scanlet has two adjacent dark triangles, bordered by a reverse "L" which extends 1× above and 1× below the bars of the body of the Scanlet. The bottom edge of the reverse "L" is nominally 1× high and 13× wide, but is tapered at both ends as shown in FIG. 1. The right edge of the reverse "L" is 2× wide throughout the central 10× of its height, but is tapered at the top and bottom. In the Scanlet of FIG. 1, the triangles are each 4× wide, nominally 6× high (but this is not a critical dimension), and are positioned vertically to be centered within the height of the bars of the body of the Scanlet. The rightmost triangle ends 2× to the left of the 2× vertical portion of the reverse "L". The same Interface Graphic can be printed for both standard and GT Scanlets.

With regard to decoding, a standard Scanlet and a GT Scanlet can be auto-discriminated and decoded as follows. A candidate Scanlet can be found within a scan line of bar and space measured values, by using the following steps (see FIG. 4 for a representation of the measurements needed to find and validate a Start pattern):

1. To find a Scanlet, perform the following steps at each bar position:

a) sum the widths of the 8 elements starting from the current bar position. Check that the sum of the next 6 elements is greater than the sum of these 8, but less than 1.5 times the sum of these 8. If so, then divide this sum of eight elements by 8 to obtain "Z", the average module width. Validate these as a candidate Finder pattern with seven edge-to-similar-edge distances between 1.5Z and 2.5Z. For the Scanlet Finder pattern shown in FIG. 4, this step consists of computing $Z=(f1+f3+f5+f7)/8$ and checking that f1 through f7 are each between 1.5Z and 2.5Z.

b) To look also for a possible reverse scan, sum the current bar width and the prior seven element widths. Check that the sum of the 6 elements prior to these 8 is greater than the sum of these 8, but less than 1.5 times the sum of these 8. If so, divide by sum of the 8 elements by 8 to obtain "Z", the average module width. Check for a trailing Finder pattern with seven edge-to-similar-edge distances between 1.5Z and 2.5Z.

c) The leading elements of the Start pattern are not checked until after the Stop pattern has been found and decoded (see step 2).

2. Verify that a valid Stop pattern was scanned, starting n elements past the Finder pattern (if enough elements are present in that direction), and starting n elements before the Finder pattern (if enough elements are present in that direction), where n is an even multiple of six, in the range of 18 to 48 inclusive. Search by summing each set of six elements until a set is reached that, when multiplied by 1.25, is less than the width of the previous group. Then determine which version of Scanlets is present, and decode the stop character accordingly, as follows:

a) Compare the third and fourth bars of the Stop pattern.

i) If the third bar is wider than the fourth bar, then this 8-element Stop pattern indicates a standard Scanlet. Calculate Z based on these eight elements, normalized to 9 modules. Verify that the eight elements decode as a T sequence of 2, 2, 2, 3, 3, 2, 2. Also verify that the total width of these 8 elements is less than the total width of the previous six elements, but greater than 0.75 times the total width of the previous six elements.

ii) Otherwise (i.e., the fourth bar is wider than the third bar), this indicates a GT Scanlet. Calculate Z based on the first eight elements, normalized to 14 modules.

Verify that the eight elements decode as a T sequence of 2.5, 2.5, 2.5, 3.5, 3.5, 5.5, 5.5. Also verify that the total width of these 8 elements is greater than the total width of the previous six elements, but less than 1.25 times the total width of the previous eight elements.

b) Now that the Scanlet version has been determined, and therefore the size of the narrow spaces is known, the leading elements of the Start pattern can be verified. Calculate the value of Z as:

$$Z=(f1+f3+f5+f7)/n\text{Modules},$$

Where nModules is 8 or 10, for standard Scanlets or GT Scanlets, respectively. Verify that the first two measurements of the Start pattern (T1, T2) decode to (5, 4) if decoding a standard Scanlet, or to (4.5, 3.5) if decoding a GT15 Scanlet. In either case, each measurement is given a tolerance of ±0.5Z. Set the scan direction based on the validated Start and Stop patterns.

3. Beginning at the inner end of the Finder pattern, decode the succeeding groups of six elements as standard Code 128 symbol characters in the direction determined from step 3. Continue until either an invalid data character pattern is detected, or until the position of the Stop pattern has been reached. If a group of six elements is of the proper width for a data character, but decodes to a Code 128 value of 33, 62, or 92, the character is invalid. Unless in the check character position, values greater than 102 are also invalid.

4. Verify that the symbol check character calculated is correct. In addition, verify that the symbol contained at least three symbol characters (including the check character, but excluding the Start and Stop patterns) and at most eight symbol characters.

5. Translate the symbol characters into a string of digits. Each symbol character translates directly into a pair of digits (from the "Scanlet Value" column of Table I), in the range of "00" through "99".

6. In addition, perform such other secondary checks on quiet zones, beam acceleration, absolute timing, dimensions, etc., as are deemed prudent and appropriate considering the specific reading device and intended application environment.

In this algorithm the symbol is decoded using "edge to similar edge" measurements, plus an additional measurement of the sum of the three bar widths to check the parity of each symbol character.

Figure 5:
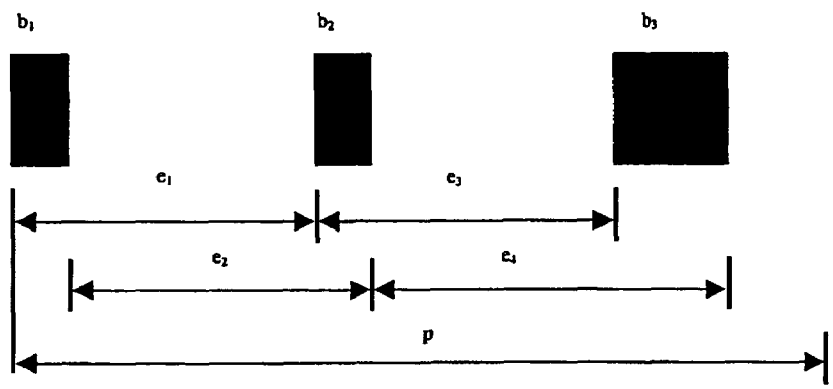
FIG. 5 shows the character code measurements for a Scanlet.

The number of modules per symbol character, n, is 11 for standard Scanlets, and 12.5 for GT Scanlets. Use the following steps to decode each character within a Scanlet:

1. Calculate eight width measurements p, $e_1$, $e_2$, $e_3$, $e_4$, $b_1$, $b_2$, and $b_3$ (see FIG. 5).

2. Convert measurements $e_1$, $e_2$, $e_3$, and $e_4$ to normalized values $E_1$, $E_2$, $E_3$, and $E_4$ which will represent the module width ($E_i$) of these measurements. The following method is used for the i-th value.

For Standard Scanlets:
If $1.5p/n \leq e_i < 2.5p/n$, then $E_i = 2$
If $2.5p/n \leq e_i < 3.5p/n$, then $E_i = 3$
If $3.5p/n \leq e_i < 4.5p/n$, then $E_i = 4$
If $4.5p/n \leq e_i < 5.5p/n$, then $E_i = 5$
If $5.5p/n \leq e_i < 6.5p/n$, then $E_i = 6$
If $6.5p/n \leq e_i < 7.5p/n$, then $E_i = 7$
Otherwise the character is in error.
For GT Scanlets:
If $1.9p/n \leq e_i < 3p/n$, then $E_i = 2$
If $3p/n \leq e_i < 4p/n$, then $E_i = 3$
If $4p/n \leq e_i < 5p/n$, then $E_i = 4$
If $5p/n \leq e_i < 6p/n$, then $E_i = 5$
If $6p/n \leq e_i < 7p/n$, then $E_i = 6$
If $7p/n \leq e_i < 8.15p/n$, then $E_i = 7$
Otherwise the character is in error.

Note that the lower bound for a normalized value of 2, and the upper bound for a normalized value of 7, allow for a small amount of round-off error that can be introduced when a GT Scanlet's X dimension translates to an odd number of printer dots per nominal module.

3. Look up the character in a decode table using the four values $E_1$, $E_2$, $E_3$, and $E_4$ as the key. This decode table may be found in the Code 128 specification, or may be derived directly from Table I. If using the decode table in the Code 128 specification, note that the $STOP_A$ and $STOP_B$ patterns are invalid when decoding a Scanlet.

4. Retrieve character self-checking value V which is stored in the table with the character (or which can be derived directly from Table I). The value V is equal to the sum of the modules for the bars as defined for that character.

5. Verify that $(V-1.75)p/n < (b1+b2+b3) < (V+1.75)p/n$. Otherwise the character is in error.

The calculation indirectly uses character parity to detect all decode errors caused by single non-systematic one-module edge errors.

The Start pattern of a standard Scanlet has five bars and five spaces comprising 13 modules. The Stop pattern has four bars and four spaces comprising nine modules, terminated by a dark element at least one module wide. The decodability of the Start and Stop patterns can be measured using the standard verification formula for V used above, but substituting n=13 or n=9, rather than n=11, to reflect the lengths of those patterns.

The Start pattern of a GT Scanlet has five bars and five spaces comprising 14.5 modules. The Stop pattern has four bars and four spaces comprising fourteen modules, terminated by a dark element at least one module wide. The decodability of the Start and Stop patterns can be measured using the standard formula based on V and used above, but substituting n=14.5 or n=14, rather than n=12.5, to reflect the lengths of those patterns.

Figure 4:
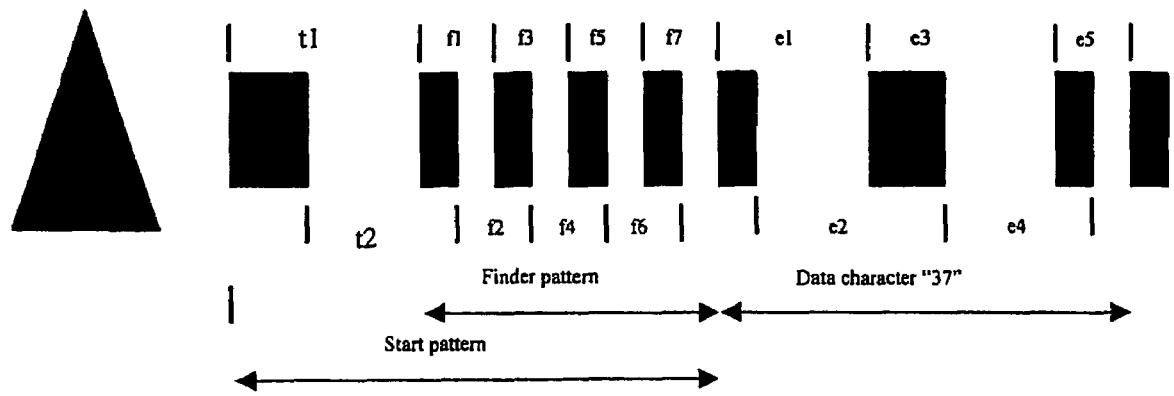
FIG. 4 shows the start pattern measurements for a Scanlet.

The seven edge-to-similar-edge distances in the Finder pattern preferably are each 2.0±0.315Z, the measurement labeled t1 in FIG. 4 preferably is 5.0±0.315Z, and the measurement labeled t2 in FIG. 4 preferably is 4.0±0.315Z. For these measurements, Z is the average measured module width over the eight modules of the Finder Pattern.

The width of the terminating dark element to the right of the Stop pattern preferably is at least 1× wide, but no more than 4× wide. An extra edge-to-similar-edge measurement T, summing the last space of the Stop pattern and the terminating dark element, can be made on each scan reflectance profile. Using the value of Z from the Stop pattern, each scan reflectance profile under ISOI/IEC 15416 preferably can be measured and graded as follows:

T>=1.685Z and T<=5.75Z: Grade 4
T<1.685Z or T>5.75Z: Grade 0

Figure 6:
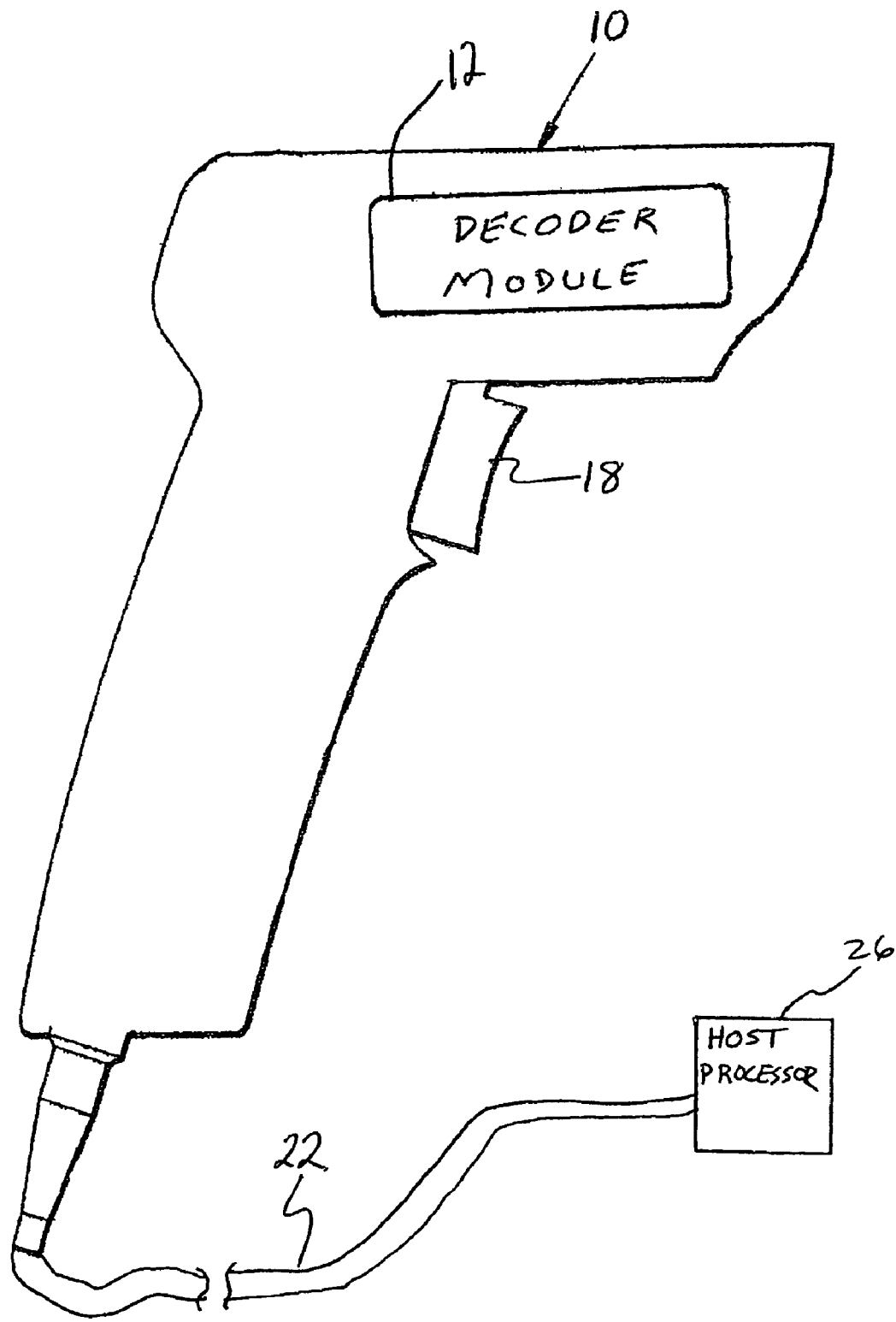
FIG. 6 shows a schematic view of an exemplary optical code reader system having a decoder module in accordance with the present invention.

FIG. 6 shows an optical code reading device 10 for reading optical codes. The reading device has a decoder module 12, i.e., a decoder, for performing an algorithm for decoding scanned optical codes. The reading device 10 may be configured as a laser reading device or as an imager reading device. The reading device 10 may be in data communication with a host processor 26.

The reading device 10 is provided with an actuation device, such as a manual trigger 18 mounted in moving relationship with a housing of the reading device 10. A coupling 22 is provided for connecting the reading device 10 to the host terminal 26. Couplings 22 may include wired or wireless couplings, such as a flexible electrical cable, communication means such as radio frequency, optical or cellular communication means; and/or an interface, such as an infrared data interface (IRDA), a multi-contact shoe or a docking device.

The host terminal 26 includes at least one data processor, where the at least one data processor may be connected to one or more peripherals or computing devices, such as a video monitor, and/or a network. Analog and/or digital devices may be provided in the reading device 10 and/or the host processor 26 for processing signals corresponding to sensing of light reflected from a target being imaged or scanned by the reading device 10. The decode module 12 may be provided in the reading device 10 and/or in the host terminal 26.

The reading device 10 may be configured as a portable device, such as a conventional handheld scanner gun or incorporated into a PDA. Alternatively, the reading device 10 may be configured as a non-portable device, such as by being incorporated into a computer terminal in a fixed location, in a rotating turret, and/or in a video phone system. Furthermore, the reading device 10 may be incorporated into a system, such as a local area, cellular or wide area network.

The decoder module 12 processes signals corresponding to sensing of light reflected from an optical code, including discriminating between optical codes that are compensated and optical codes that are not compensated, and decoding the optical code in accordance with the results of the discrimination, as described above, including uncompensating the optical code when necessary.

With reference to FIG. 7, a functional block diagram of a preferred embodiment of the reading device 10 is shown, where the reading device includes the decoder module 12, an illumination source 702, a photo sensor module 704, a signal processing module 706, and a control logic module 710.

The illumination source 702 provides illumination for illuminating the target to be scanned by the reading device. In the embodiment in which the reading device 10 is a laser device, the illumination source 702 may include, for example, a laser tube, such as a coaxial helim neon laser tube, or an LED, or a semiconductor laser diode. In the embodiment in which the reading device 10 is an imaging device, the illumination source 702 may include, for example, a lenslet plate and an illumination printed circuit board, e.g., a circuit board having a plurality of light emitting diodes.

The photo sensor module 704 senses incident light reflected from a target being scanned, and generates electrical signals corresponding to the sensing. In an embodiment in which the reading device 10 is a laser device, the photo sensor module may include a sensing circuit having a photo detector element, such as a semiconductor photodiode. In an embodiment in which the reading device is an imaging device, the photo sensor module 704 may be included in an imaging engine, and the photo sensor module 704 may include, for example, a charge coupled device (CCD), a CMOS device, charge modulated device (CMD) or charge injection device (CID) sensors. The photo sensor outputs an array of electrical signals corresponding to pixels of an image of the field of view of the imaging device. The array may be one-dimensional, such as for a linear imager reading device or two-dimensional, such as for an area imager reading device. An objective lens assembly (not shown) having at least one lens may be included for focusing light incident on the photo sensor module 704, and may further include a lens guidance assembly (not shown) for supporting the at least one lens, and a lens adjustment mechanism (not shown) for moving the at least one lens along the lens guidance assembly, such as for changing the focal length of the lens assembly.

The signal processing module 706 processes the signals generated by the photo sensor module 704. The signal processing module 706 may include analog and/or digital components for performing functions, such as analog-to-digital conversion, timing generation, gain control, amplification and/or buffering. The processed signals are provided to the decoder module 12 and/or the control logic module 710.

The control logic module 710 provides control to components of the reading device, such as by processing the signals output by the photo sensor module 702 and/or the signal processing circuitry for generating control signals for controlling focusing, illumination, digital processing of the processed signals, etc. The control logic module 710 may include analog and/or digital components, such as a data processing component, for example a microprocessor and/or a field programmable gate array (FPGA), and a storage component, such as a flash memory device and/or a DRAM memory device. The control logic module 710 may further include software instructions executable on a processor. Further, the control logic module 710 may communicate with an external device, such as the host terminal 26.

The decoder module 12 decodes a code being read by the reading device 10, including processing signals output by the signal processor 206 that correspond to an optical code, preferably, determining if the optical code is compensated, as described above, uncompensating if necessary, and decoding the code. The decoder module 12 includes software instructions that are executable on a processor, where the instructions may be stored and/or executed in the reader device 10 or in the host terminal 26. As described above, the decoder module 12 uses T distances associated with adjacent printed areas and spaces of optical codes, such as for determining if a code is compensated, for uncompensating a compensated optical code for generating an uncompensated optical code; for decoding the uncompensated optical code and/or for determining the adjustment factor of a dimension of spaces of an ink-spread compensated code.

For the embodiment in which the reader device 10 is a laser device, the T distances for the code and its respective characters are determined in accordance with the traversal time for traversing the code and its respective characters as the code is scanned along the dimension that is being measured (e.g., the width), where the traversal time may be measured in units such as microseconds (msec). For the embodiment in which the reader device 10 is an imaging device, the T distances for the code and its respective characters are determined in accordance with the number of pixels of image data that correspond to the dimension (e.g., width) of the code and its respective characters that is being measured, which is measured in pixel units. The T distances are further determined by normalizing, as described above, during which process the units used for measuring are cancelled out. Accordingly, once normalized, the T distances are not unit specific and the process for decoding the optical code (including determining if the code is compensated, uncompensating the code when appropriate, and then decoding the code) is substantially the same for codes that were read by as laser device and an imager device.

As described above, when generating the uncompensated code, the decoder uncompensates for the adjustment of the dimension of individual spaces of the optical code in accordance with the adjustsment factor without uncompensating for a dimension of individual printed areas of the compensated optical code. The adjustment factor may be predetermined or determined by the decoder. The decoder uses the methods and algorithms described above with respect at least to discrimination between compensated codes and uncompensated codes, determining the type of compensation used, uncompensating the code and decoding the code.

As is well known in the art, graphics software used to create bar codes on pixel-based printers must scale each bar and space exactly to the pixel pitch of the printer or digital imaging system being used. For edge to similar edge decodable symbologies, like Scanlets, the number of pixels comprising each symbol character must be a fixed and constant integer multiple of the number of modules in the symbol character. For Scanlets, the number of modules is 11 for symbol character values 0 to 105. Therefore, a given printer can only print a certain set of X dimensions.

Compensation for uniform bar width growth (or loss) should be in equal offsetting amounts on all bars and spaces in the symbol. This can be accomplished by changing an integer number of pixels from dark to light or light to dark in the same manner for each bar-space pair in the symbol. For example, a vertical column of pixels along the same edge (leading or trailing) of every bar in the symbol could be changed from dark to light. Alternatively, pixels along both edges of every bar in the symbol could be changed from dark to light, provided that the printer resolution is sufficient to allow this to be performed uniformly. Any set of dark to light or light to dark pixel changes is acceptable provided the adjustment is performed consistently across the whole symbol and does not change the edge to similar edge measurements or the total symbol character width. Failure to follow these principles can result in degraded symbol quality and unreadable symbols.

General-purpose printing software designed to support a wide range of printers can be used to provide a user with the capability of adjusting the X dimension and bar width growth or loss.

With reference to FIG. 8, a system 800 is shown for generating compensated optical codes. The process of encoding an optical code so that it is compensated (e.g., compensating the optical code) as performed by the system 800 may be performed in addition to (e.g., before) the method described above for adjusting the X dimension for bar width growth or loss, or may be performed without adjusting the X dimension described above. The system 800 includes a processor assembly 802, which may be coupled to a printer 804 via a coupling 806. The processor assembly 802 includes at least one processor and storage device. A compensator module 808 is executable on the at least one processor.

The at least one processor may include, for example, a personal computer, a microprocessor, a handheld computing device, server, etc., or a combination thereof. The at least one storage medium may include, for example, a hard drive, a CD-ROM, RAM, flash memory, volatile memory, non-volatile memory, etc. The compensator module 808, or a portion thereof, may reside on a server and/or on storage accessible by the server, where the server is accessible by a plurality of computers, such as on the basis of a membership and/or fees for services. For example, a user may operate a workstation, such as a personal computer, in order to use the compensator module 808, where execution of the compensator module 808 is performed at the server or at the workstation. Alternatively, the compensator module 808 may reside on one or more workstations or on storage accessible thereby. Furthermore, the compensator module 808 may be embedded within or linked to another system, such as an administrative information storage system.

The coupling 806 may be a wired or wireless coupling, which may be provided by one or more networks, such as a LAN, a WAN, an intranet, the Internet or a combination thereof. The printer 804 is preferably a commercially available printer, where the software executed by the processor assembly 802 is compatible with the printer 804.

The processor assembly 802 receives a file including data to be encoded or a file including data representing an uncompensated optical code encoded in accordance with an existing optical code encodation scheme which may be in a format that is not printing-ready (such as shown in Table I) or in a format that is printing-ready. The digital representation may include a pictorial representation of an optical code represented digitally, where the optical code is not compensated. As used here, printing-ready format refers to a format in which the code is converted into a format using printing units understood by the printer, such as pixels, indicating which and/or how many printing units are to be printed, and which and/or how many printing units are to be left blank during the printing process. The processor assembly 802 may further receive information or use predetermined values for at least the desired adjustment factor; specifications of the printing device 206, such as dots per mm.; the desired module dimension for the symbol to be printed; and conventions to be used for rounding up or rounding down when determining printing unit amounts.

The compensator module 808 converts the received data or optical code into a compensated optical code. Furthermore, the compensator module 808 may output the compensated optical code in print-ready formatted. When the received file includes data to be encoded, the compensator module 808 encodes the received data to generate an uncompensated optical code in accordance with an existing optical code encodation scheme. The compensator module 808 compensates the uncompensated optical code by determining a pattern of representations of printed areas and spaces in the existing encodation scheme, where the represented printed areas and spaces each have a respective length in a least one dimension as a function of a given unit of length for encoding information.

In accordance with the description above with respect to the modified or compensated optical code symbology and the method for modifying the optical code symbology, the compensator module 808 generates a modified or compensated code symbol by adjusting the length of respective spaces by a predetermined length, without adjusting the length of the respective printed areas so that the length of the respected printed areas remains unchanged. The compensator module 808 may include an auto-discrimination feature in the modified code indicating that the code is modified. The auto-discrimination feature may include the magnitude of the predetermined length. The auto-discrimination feature may be included in a data character pattern or a start and/or stop pattern portion of the optical code. The existing optical code encodation scheme may be a barcode scheme, and more specifically may be an n,k bar code encodation scheme. The predetermined length may be a function of a module width of a character of the modified code.

It is contemplated that the compensated optical code may be reversed so that only a dimension of the printed areas is adjusted (enlarged or reduced) and the dimension of the spaces is not adjusted. Accordingly, it is contemplated that the decoder module 12 of the reader device 10 uncompensates the compensated optical code by adjusting the dimension of the spaces and not the printed areas. Furthermore, the decoder module 12 may recognize a feature included within the presented optical code and determine from the feature which of the printed areas and spaces should be uncompensated. It is further contemplated that the compensator module 808 generates the compensated optical code by adjusting the dimension of the represented printed areas, and not adjusting the dimension of the represented spaces. Even further, it is contemplated that the compensator module 808 includes a feature in the compensated optical code indicating for which of the represented printed areas and spaces the dimension was adjusted.

While printed optical codes and printing of optical codes including first and second elements having first and second reflectivity properties, respectively, has been described in the above disclosure, one skilled in the art can appreciate that at least a portion of the first and second elements may be produced or presented in other fashions, such as by using methods of removing, depositing or deforming material so as to vary the optical contrast of a surface (e.g., etching, peening), projecting and/or displaying the optical code on a display device, etc., in addition to or in combination with printing. (An example of a presented optical code may include an optical code that is partially printed and partially etched, or produced using a different combination of methods described above.) Furthermore, one skilled in the art can appreciate that the objective of compensating for ink-spread in printed optical codes is applicable to optical codes produced or presented in other fashions, as described above. Accordingly, reference throughout the application to printed optical codes and printing of optical codes applies to optical codes produced or presented in other fashions and the producing or presenting of optical codes in other fashions.

It will be understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. An optical code reader system for reading a presented optical code having first and second sets of elements, the first set of elements including a plurality of elements having a first reflective property and the second set of elements including a plurality of elements having a second reflective property, the system comprising:

a photo sensor module for sensing incident light reflected from the presented optical code and generating electrical signals corresponding to the sensing; and a decoder module includes software instructions executable on at least one processor for providing for processing the electrical signals for performing an algorithm including the steps of:

providing for uncompensating the presented optical code by adjusting a relative measured dimension of individual elements of the first set of elements in accordance with a predetermined adjustment factor for uncompensating the first set of elements without uncompensating the second set of elements for generating an uncompensated optical code; and providing for decoding the uncompensated optical code.

2. The system according to claim 1, wherein at least a portion of the plurality of elements having the first reflectivity property and the plurality of elements having the second reflectivity property are produced by at least one of removing, depositing and deforming material so as to vary optical contrast of a surface, projecting, displaying on a display device, and a combination thereof.

3. The system according to claim 1, wherein the providing for uncompensating step further includes the step of:

providing for determining a T distance for a sequence of respective pairs of an adjacent element having the first reflectivity property and an element having the second reflectivity property normalized against a sum of the measured dimensions of respective elements forming a symbol character;

providing for determining a series of terms of a T sequence;

providing for modifying the T sequence by subtracting the predetermined adjustment factor from each term of the T sequence; and decoding the modified T sequence.

4. The system according to claim 1, wherein the algorithm further comprises the step of providing for processing at least a portion of the presented optical code for determining the predetermined adjustment factor.

5. The system according to claim 1, wherein the presented optical code is encoded by an n,k bar code encodation scheme, wherein the predetermined adjustment factor is a function of a module width of an element for a bar code of the presented optical code.

6. The system according to claim 1, wherein the algorithm further includes the step of providing for discriminating between a presented optical code that is compensated and a presented optical code that is not compensated.

7. The system according to claim 6, wherein the providing for uncompensating step is performed on a presented optical code that is compensated, but not on a presented optical code that is not compensated.

8. The system according to claim 6, wherein the providing for discriminating step includes the step of providing for recognizing a pattern included in the plurality of elements having the first reflectivity property and the plurality of elements having the second reflectivity property which indicates that the presented optical code is a compensated optical code.

9. The system according to claim 6, wherein the presented optical code further includes at least one of a start and stop pattern; and wherein the providing for discriminating step includes the step of providing for recognizing a pattern included in at least one of the start and start pattern which indicates that the presented optical code is a compensated optical code.

10. A computer readable medium storing a set of programmable instructions configured for execution by at least one processor for reading a presented optical code having first and second sets of elements, the first set of elements including a plurality of elements having a first reflective property and the second set of elements including a plurality of elements having a second reflective property, the programmable instructions comprising:

means for providing for uncompensating the presented optical code by adjusting a relative measured dimension of individual elements of the first set of elements in accordance with a predetermined adjustment factor for uncompensating the first set of elements without uncompensating the second set of elements for generating an uncompensated optical code.

11. The system according to claim 10, wherein the existing optical code encodation scheme is an n,k bar code encodation scheme.

12. A system for generating compensated optical codes comprising:

a processor assembly having least one processor;

a compensator module executable on the at least one processor for performing an algorithm comprising the steps of:

providing for receiving data associated with an uncompensated optical code encoded in accordance with an encodation scheme including a pattern of representations of first and second sets of elements, the first set of elements including a plurality of elements having a first reflectivity property and the second set of elements including a plurality of elements having a second reflectivity property; and providing for generating data representing a compensated optical code having a pattern of representations of first and second sets of elements, the first set of elements including a plurality of elements having the first reflectivity property and the second set of elements including a plurality of elements having the second reflectivity property, wherein the pattern of the compensated optical code is substantially the same as the pattern of the uncompensated optical code, except that representations of a dimension of individual elements of the first set of elements is adjusted in accordance with a predetermined adjustment factor for compensating the representations of the first set of elements without compensating the representations of the second set of elements.

13. The system according to claim 12, wherein:

the received data includes data to be encoded into a representation of the uncompensated optical code; and the algorithm further comprises the step of providing for encoding the data into the representation of the uncompensated optical code.

14. The system according to claim 12, wherein:

the received data includes a representation of the uncompensated optical code; and the algorithm further comprises the step of providing for determining the pattern of the representations of the first and second sets of elements.

15. The system according to claim 12, wherein at least a portion of the plurality of elements having the first reflectivity property and the plurality of elements having the second reflectivity property are produced by at least one of removing, depositing and deforming material so as to vary optical contrast of a surface, projecting, displaying on a display device, and a combination thereof.

16. The system according to claim 12, wherein the compensator module algorithm further includes the step of providing an auto-discrimination feature in the compensated optical code indicating that the optical code is compensated.

17. The system according to claim 16, wherein the auto-discrimination feature includes the magnitude of the predetermined adjustment factor.

18. The system according to claim 17, wherein the predetermined adjustment factor is a function of a module width of respective elements for a bar code of the uncompensated optical code.

19. A computer readable medium storing a set of programmable instructions configured for execution by at least one processor for generating a compensated optical code, the programmable instructions comprising:

means for providing for receiving data associated with an uncompensated optical code encoded in accordance with an encodation scheme including a pattern of representations of first and second sets of elements, the first set of elements including a plurality of elements having a first reflectivity property and the second set of elements including a plurality of elements having a second reflectivity property; and means for providing for generating data representing a compensated optical code having a pattern of representations of first and second sets of elements, the first set of elements including a plurality of elements having the first reflectivity property and the second set of elements including a plurality of elements having the second reflectivity property, wherein the pattern of the compensated optical code is substantially the same as the pattern of the uncompensated optical code, except that representations of a dimension of individual elements of the first set of elements is adjusted in accordance with a predetermined adjustment factor for compensating the representations of the first set of elements without compensating the representations of the second set of elements.

20. A compensated n, k bar code symbology comprising characters having k bars and k spaces having a respective dimension that varies, the dimension of each bar being from 1 to m modules, the dimension of each space being from $1+x$ to $m+x$ modules $0<x\leq2$, and wherein the overall dimension of each character is $n+kx$ modules.

21. The compensated symbology according to claim 20, wherein at least a portion of the bars and spaces are produced by at least one of removing, depositing and deforming material so as to vary optical contrast of a surface, projecting, displaying on a display device, and a combination thereof.

22. An uncompensated bar code symbology and related compensated symbology;

the uncompensated bar code symbology comprising a set of uncompensated patterns of first and second elements having first and second reflectivity properties, respectively, each uncompensated pattern encoding a respective value, a respective dimension of each first and second element being from 1 to m modules; and the compensated symbology comprising a set of compensated patterns of first and second elements having first and second reflectivity properties, respectively, each compensated pattern encoding a respective value and corresponding to an uncompensated pattern encoding the respective value, the respective dimensions of the second elements in the compensated pattern equaling the respective dimensions of the corresponding second elements in the corresponding uncompensated pattern, the respective dimensions of the first elements in the compensated pattern equaling the respective dimensions of the corresponding first elements in the corresponding uncompensated pattern value plus x modules, $x>0$.

23. The symbology according to claim 22, wherein at least a portion of the first and second elements of the compensated code and the uncompensated code are presented by at least one of removing, depositing and deforming material so as to vary optical contrast of a surface, projecting, displaying on a display device, and a combination thereof.

* * * * *